United States Patent [19]
Celi

[11] Patent Number: 5,196,154
[45] Date of Patent: Mar. 23, 1993

[54] APPARATUS FOR THE TREATMENT OF METAL-LAMINATED PLASTICS SCRAP

[76] Inventor: Antonio M. Celi, Im Engelsgarten 2, D-5466, Neustadt, Italy

[21] Appl. No.: 803,140

[22] Filed: Dec. 5, 1991

[51] Int. Cl.[5] .............................................. C21D 11/00
[52] U.S. Cl. ........................................ 266/78; 75/403; 266/99; 266/200; 266/205
[58] Field of Search ...................... 75/403; 266/78, 99, 266/200, 205

[56] References Cited

U.S. PATENT DOCUMENTS

| | | | |
|---|---|---|---|
| 3,821,026 | 6/1974 | Swartz | 75/403 |
| 4,091,825 | 5/1978 | Baker | 75/403 |
| 4,141,373 | 2/1979 | Kartanson | 75/403 |
| 4,828,661 | 5/1989 | Celi | 75/403 |

Primary Examiner—Peter D. Rosenberg
Attorney, Agent, or Firm—Helfgott & Karas

[57] ABSTRACT

An apparatus for the treatment of metal-laminated plastics scrap and/or radio, television or computer scrap, wherein the scrap is heated in a closed container to a temperature at which the metal-plastic bond is broken and the metal and plastics parts are segregated from each other. The apparatus comprises a heatable container which is provided with a closable scrap charging opening and a closable products removal opening. An inert feed conduit and inert gas removal conduit are connected to the container which is formed as a rotary tube. An inert gas washing chamber is provided between the inert gas removal conduit and the inert gas feed conduit.

8 Claims, 2 Drawing Sheets

APPARATUS FOR THE TREATMENT OF METAL-LAMINATED PLASTICS SCRAP

BACKGROUND OF THE INVENTION

Metal-laminated plastics, in particular copper-laminated and aluminum-laminated plastics are being used to an ever increasing extent in the production processes of the electronics and electrical industry as printedcircuit boards, integrated circuits and the like and, as a consequence, correspondingly large amounts of residual and scrap material are generated in these production processes, the disposal of which causes ever greater problems.

The appliances produced in such a way also cause the same problems when they have served their useful purpose and are discarded. Dumping at refuse sites is environmentally too hazardous on account of the high metal content and is no longer allowable. Dumping at special refuse sites on the other hand is extremely expensive and, with the ever greater quantities, does not represent a solution to the problem.

SUMMARY OF THE INVENTION

It is the object of the present invention to provide a novel inexpensive treatment process by which these metal-laminated plastic parts, generated in enormous quantities, can be disposed of, the metals segregated and recovered and the plastic parts — where they are thermoset plastics — reduced and used as fillers in other plastics materials or — where they are thermoplastics — likewise reprocessed into new plastic articles.

According to the invention, this object is achieved by a process for the treatment and separation of metal-laminated plastics scrap and/or radio, television or computer scrap, wherein the scrap is heated in a closed container to a temperature at which the metalplastic bond and, if appropriate, the metal-metal bonds part and then the metal parts are segregated from the plastic parts using usual physical separating methods.

The different coefficient of expansion of the metal layer on the one hand and of the plastic on the other hand in this case results in surprisingly quick peeling of the metal from the plastic.

The separating of the heated scrap material, obtained for example in a batch process, for segregating the metal parts from the plastic parts can be performed in different ways. A relatively simple process is based on the great difference in the relative density of metal parts on the one hand and plastic parts on the other hand. Thus, for example, the heated material can be introduced into a liquid, in which the plastic parts float and the metal parts on the other hand settle as sediment. Air-sifting is likewise possible and ensures a good separation of metal and plastic.

It has proved to be particularly expedient if the scrap mentioned is heated in a closed container under an inert gas atmosphere. A nitrogen atmosphere may serve, for example, as such an inert gas atmosphere, thereby preventing oxidation of the metal parts from occuring during heating. Furthermore, it is accomplished with this advantageous embodiment of the process according to the invention that decomposition products and other volatile constituents; which result for example from the adhesives or plastics used, do not pass into the atmosphere.

The heating of the plastic-metal scrap to be treated is expediently performed in an externally heated rotating container.

Burners operated on liquid gas or on heating oil may be used, for example, for heating-up.

Another particularly advantageous embodiment of the process according to the invention uses high frequency for heating up the scrap, said high frequency thus heating the metal parts specifically and ensuring a rapid peeling of the same from the plastic parts.

A further advantageous method of heating up the plastic-metal scrap to be treated is that the heating of the scrap is performed with a heated inert gas stream passed through the container. The inert gas is expediently circulated, and heated to the operating temperature by an electric heating source or a correspondingly dimendimensioned heat exchanger.

On entering the reaction container the inert gas transmits its thermal energy substantially to the plastic-metal parts to be heated up and leaves the reaction vessel together with any volatile decomposition products formed. After leaving the container, the inert gas is then cooled, expediently washed in a column with water and then, after corresponding heating-up, returned again into the reaction container.

The decomposition products and other volatile constituents accumulate in the washing water of the column, without poisoning the atmosphere.

It has proved to be very expedient if the scrap is subjected to mechanical working during heating in the container. This can take place, for example, by the container rotating, so that the material in it is constantly circulated. Special vanes, which are fitted inside the container, thereby assist this mechanical movement of the material to be heated. Furthermore, steel balls, steel chains and similar formations may also be arranged in the container, which assist the mechanical working on account of the rotation of the container.

The container is expediently designed as a rotary tube.

For the working of metal-laminated plastics scrap, it has proved to be expedient if the temperature in the container is in the range of 150° to 190° C.

In order to use as little energy as possible for heating the metal-laminated plastics scrap to be treated, it has proved to be particularly expedient if the container is designed as a rotary tube which rotates about its longitudinal axis and is surrounded by a heating jacket.

The heating jacket is fixed and also expediently has on its outside a further thermal insulation, in order to keep the loss of heating energy as small as possible.

For the treatment of television, radio and computer scrap, the process according to the invention can be used in the same way. All that is necessary is to increase the heating temperature in the container to the range from 250° to 350° C., in order that the metal-metal connections, in particular the solder connections, contained in these appliance parts are parted.

The molten soldering agents accumulate as liquid metal on the bottom of the container and are drained off separately and, if appropriate, cast in the form of ingots.

The plastics and the metal parts are separated from electronic components and the latter are further processed by a wet treatment. For this purpose, the metal components together with metal-containing slurries are converted into metal ions and recovered in an ionexchange process. Germanium, nickel, molybdenum etc. are obtained in particular by this method.

The plastics, usually comprising thermoset plastics, are reduced, in particular ground, and reused as fillers together with other plastics materials.

The apparatus for carrying out the process according to the invention comprises a heatable container which is provided with a closable charging opening and a closable removing opening as well as with a feed and a let-off means for inert gas and expediently has a gas washing means for the inert gas leaving the container.

In this arrangement, the container is expediently designed as a rotary tube container which has transporting blades inside it for circulating the scrap.

For heating up the material with which the rotary tube container is filled, this rotary tube container can on the one hand be rotatably arranged in a heating jacket, in which gas or oil burners are provided for heating the rotary tube container. Instead of this external heating, the inert gas itself may be used for heating up the material to be treated. According to an advantageous embodiment of the present invention, the inert gas is therefore continuously circulated through the container and a gas washing means and the inert gas thus freed of decomposition products and other volatile constituents then flows through a heating means, is heated therein to the operating temperature and returned into the container, where it gives of its thermal energy to the material to be treated.

The heating-up of the inert gas can in this case be performed either directly by electric heating means or a correspondingly designed heat exchanger is provided, which heats the inert gas to the required temperature.

An apparatus in which a high-frequency heater is provided for heating the scrap has proved to be particularly advantageous. The container, in this case expediently produced from ceramic material, has in this arrangement on its outside wall correspondingly designed, high-frequency heaters, which transfer the energy with preference to the metal parts and thus induce a parting of the metal-plastic bond.

Irrespective of the heating method used, it has proved to be very expedient if the material to be treated is subjected to mechanical working during heating. For this, on the one hand metal balls or heavy metal chain links may be used, which are fitted in the rotary tube and are raised upon rotation of the vanes and then fall back onto the material to be worked.

The metal balls or the metal chain links are in this case fastened by means of flexible holding means to the wall of the rotating container, so that they retain the radius of action assigned to them and it is ensured that mechanical working of the heated material is performed over the entire length of the tubular container.

BRIEF DESCRIPTION OF THE DRAWINGS

The apparatus according to the invention for the treatment of metal-laminated plastics scrap is explained in further detail below with reference to the attached drawings, in which.

DETAILED DESCRIPTION OF THE PREFERRED EMBODIMENTS

Figure 1:
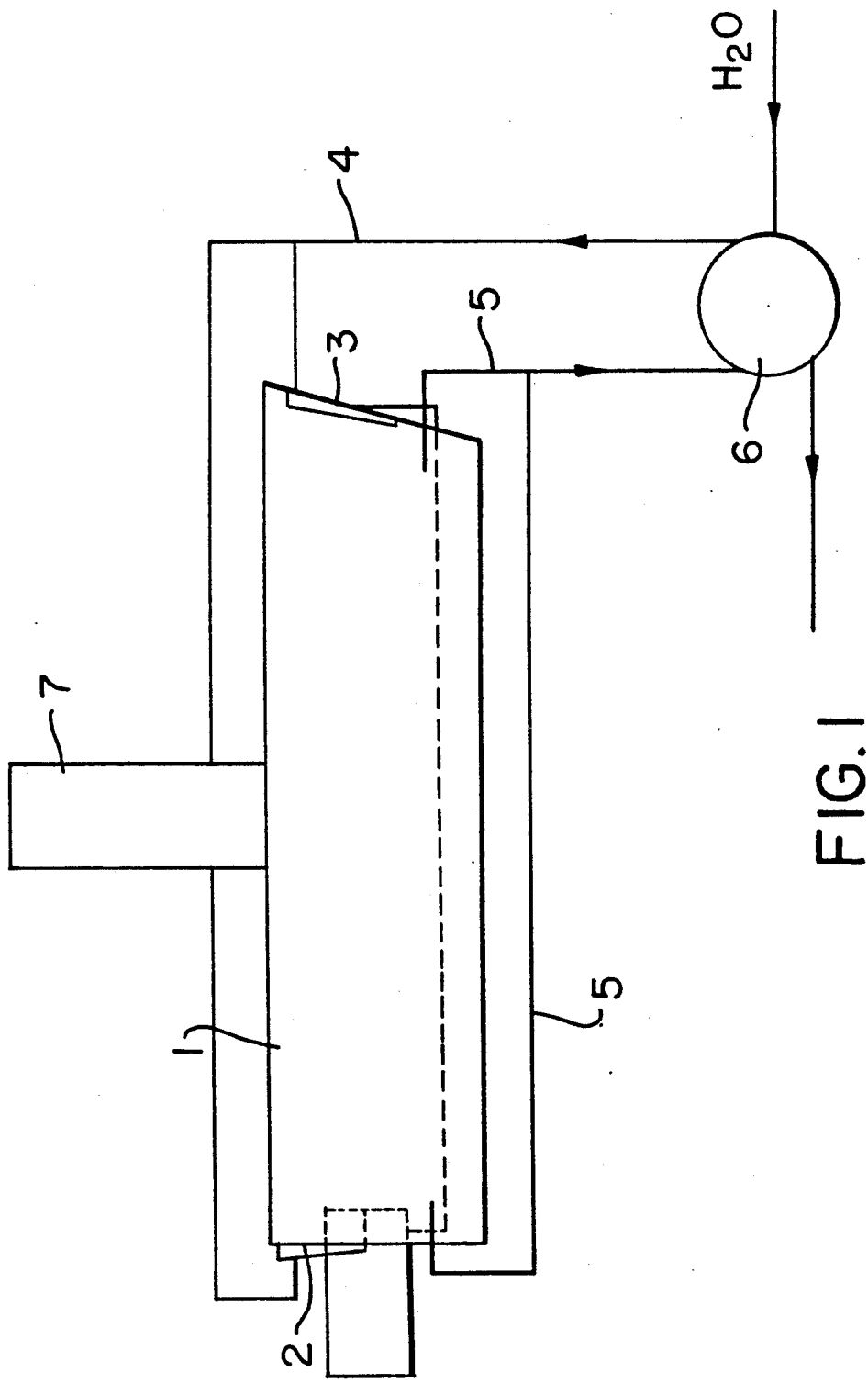
FIG. 1 shows a diagrammatic representation of the apparatus according to the invention for the treatment of metal-laminated plastics scrap.

In the case of the apparatus shown in FIG. 1, the externally heated rotary tube 1 is charged via the receiving lock 2 with the metal-laminated plastics scrap to be treated, the thermally treated plastics scrap leaves the rotary tube via the lock 3. Nitrogen as inert gas is introduced both via the lock 2 and via the lock 3 into the rotary tube and is drawn off again in charged form via the line 5.

The inert gas thus charged with decomposition products and volatile constituents is cooled and then washed in a column 6 with water and then recirculated into the container 1.

Losses of nitrogen caused by leakages in the apparatus are automatically compensated by new nitrogen.

The water charged with phenol and other decomposition products, generated in the column 6, is disposed of separately.

The heating of the container 1 is performed by means of a gas or oil burner (not shown), the waste combustion gases escaping via the stack 7.

Figure 2:
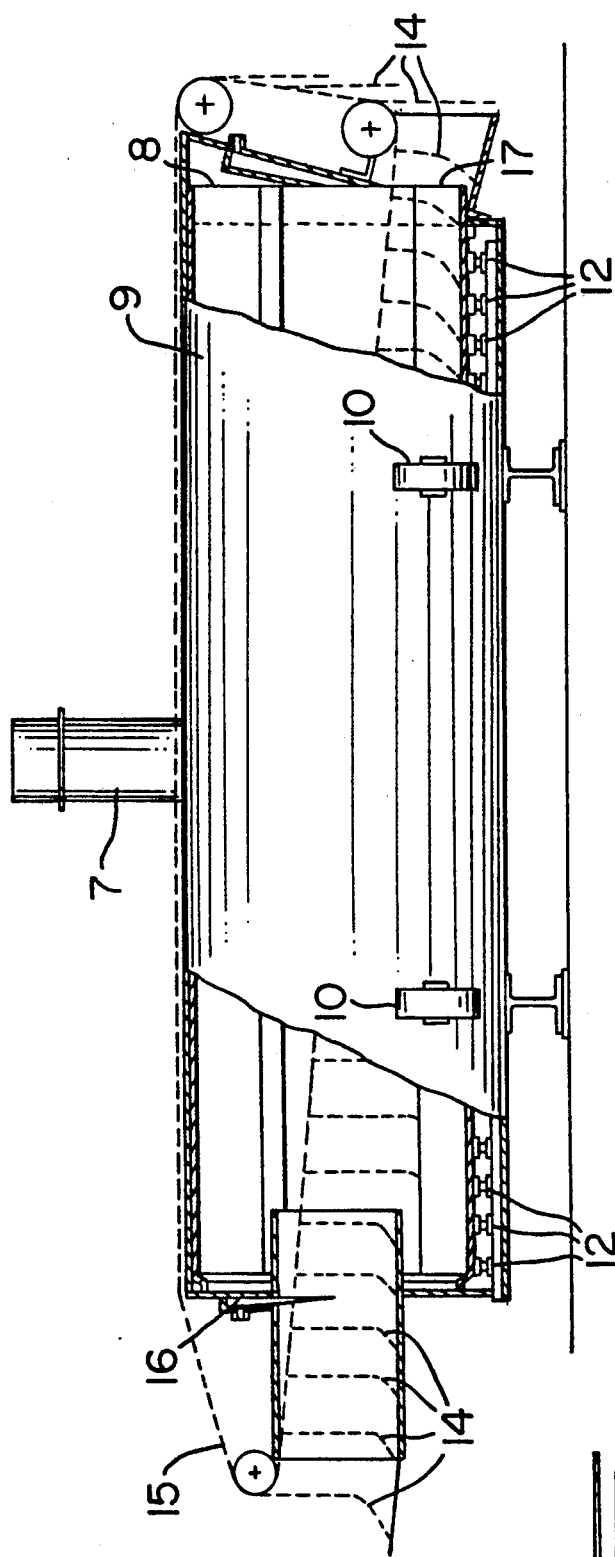
FIG. 2 shows a partially sectional side view of the apparatus comprising a rotary tube container.
Figure 3:
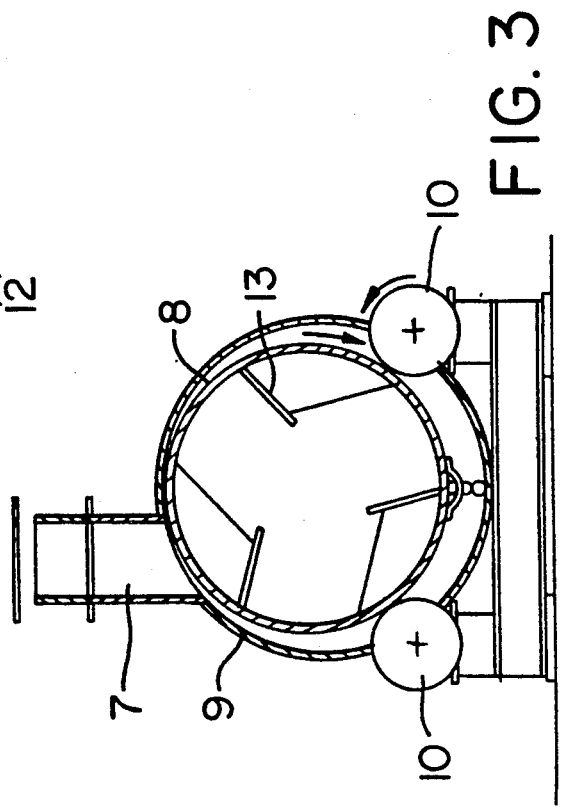
FIG. 3 shows an end view of the apparatus shown in FIG. 2, in section.

In the case of the embodiment shown in FIGS. 2 and 3, the container 8, designed as a rotary tube, is rotatably arranged in a jacket 9 on the pairs of roller bearings 10 and 11. The gas burners 12 provide the heating of the container 8, which is provided inside with vanes 13, whereby the filled material to be treated is constantly circulated during the rotation.

Furthermore, for mechanical working of the material to be treated, a circulating chain 15, provided with short chain ends 14, is passed through the container 8, whereby mechanical working of the material is achieved.

The material to be treated, introduced via the feed opening 16, leaves the rotary tube container 8 via the outlet opening 17 and is then separated into the metals of relatively higher density and the plastics of relatively lower density by sedimentation in suitable liquids or else by a wind-sifting method. The plastics thus obtained are generally thermoset plastics, which are reduced and added to other plastics again as fillers. The metal parts, in particular copper plates, are melted down into ingots and in this way passed on for further use.

In the case of the embodiment represented in FIGS. 2 and 3, the inner space of the container 8 is completely separate from the space which is formed by the jacket 9, in which the gas burner 12 provides the necessary heating. The feed opening 16 and the discharge opening 17 of the container 8 are provided with air locks. Both locks - charged with nitrogen - have a slight overpressure, it being possible for this overpressure to expand in the direction of the inner drum, because an underpressure is provided there. It is achieved in this way that the inner space of the rotating container 8 is completely separate from the outer surroundings. The outside air and its oxygen consequently do not get into the inner space, so that oxidation of the metals is prevented. On the other hand, the nitrogen introduced into the container 8 does not get out of the inner space to the outside after it has been charged with the decomposition products and the volatile constituents.

I claim:

1. An apparatus for the treatment of metallaminated plastics scrap, radio, television and computer scrap and the like, comprising a heatable container (1) provided with a closable charging opening (2) for introducing scrap into said container, a closable removal opening (3) for removing plastics and metal from the container, a feed means (4) and discharge means (5) for inert gas, respectively introducing inert gas into and removing inert gas from the container, a gas washing means (6) for the inert gas removed from the container, said gas washing means being interconnected between said feed means and said discharge means for inert gas, said container being formed as a rotatable tubular container and including means for circulating scrap introduced thereinto, and means for heating said container with the scrap introduced therein so as to break metal-plastics bond and separate plastics parts from metal parts.

2. The apparatus as claimed in claim 1, wherein the circulating means includes transporting blades inside the container for circulating the scrap.

3. The apparatus as claimed in claim 2, wherein the tubular container is positioned and rotated in a heating jacket (9), said heating means including one of gas burners and oil burners (12) provided in the heating jacket for heating the container.

4. The apparatus as claimed in claim 1, wherein the inert gas is continuously circulated through the container (1) and the gas washing means (6).

5. The apparatus as claimed in claim 4, wherein the heating of the scrap is performed with circulated heated inert gas, which runs through a heating means before entry into the container (1, 8).

6. The apparatus as claimed in claim 5, wherein an electrically operated heating means is provided for heating the inert gas.

7. The apparatus as claimed in claim 1 13, wherein a high-frequency heater is provided for heating the scrap.

8. The apparatus as claimed in 12, wherein means which permit a mechanical working of the material to be treated are provided in the container.

* * * * *